(12) United States Patent
Niina et al.

(10) Patent No.: US 9,121,223 B2
(45) Date of Patent: Sep. 1, 2015

(54) DRILLING SYSTEM WITH FLOW CONTROL VALVE

(75) Inventors: Nobuyoshi Niina, Cheltenham (GB);
Oleg Polyntsev, Cheltenham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 376 days.

(21) Appl. No.: 13/546,770

(22) Filed: Jul. 11, 2012

(65) Prior Publication Data
US 2014/0014413 A1    Jan. 16, 2014

(51) Int. Cl.
*E21B 7/08* (2006.01)
*E21B 7/06* (2006.01)

(52) U.S. Cl.
CPC .. *E21B 7/06* (2013.01); *E21B 7/062* (2013.01)

(58) Field of Classification Search
CPC ........... E21B 7/06; E21B 7/064; E21B 7/065; E21B 7/068; E21B 21/10; E21B 21/103; E21B 10/322
USPC ................... 175/61, 73, 76, 408; 137/625.15, 137/630.21
See application file for complete search history.

(56) References Cited

U.S. PATENT DOCUMENTS

| | | | |
|---|---|---|---|
| 4,637,479 A * | 1/1987 | Leising | 175/26 |
| 4,836,301 A * | 6/1989 | Van Dongen et al. | 175/61 |
| 5,113,953 A | 5/1992 | Noble | |
| 5,265,682 A | 11/1993 | Russell et al. | |
| 5,520,255 A | 5/1996 | Barr et al. | |
| 5,553,678 A | 9/1996 | Barr et al. | |
| 5,553,679 A | 9/1996 | Thorp | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A | 1/1998 | Barr | |
| 5,778,992 A | 7/1998 | Fuller | |
| 5,803,185 A | 9/1998 | Barr et al. | |
| 5,971,085 A | 10/1999 | Colebrook | |
| 6,089,332 A | 7/2000 | Barr et al. | |
| 6,092,610 A | 7/2000 | Kosmala et al. | |
| 6,158,529 A | 12/2000 | Durel | |
| 6,244,361 B1 | 6/2001 | Comeau et al. | |
| 6,364,034 B1 | 4/2002 | Schoeffler | |
| 6,394,193 B1 | 5/2002 | Askew | |
| 6,601,658 B1 * | 8/2003 | Downton | 175/45 |

(Continued)

OTHER PUBLICATIONS

Dictionary definition of "electric motor" accessed Jan. 7, 2014 via thefreedictionary.com.*

(Continued)

*Primary Examiner* — Blake Michener
(74) *Attorney, Agent, or Firm* — Chadwick A. Sullivan; Wesley Noah

(57) ABSTRACT

A technique facilitates drilling of wellbores with a steerable system having a plurality of pads which may be selectively actuated in a lateral direction to apply a side force. Application of the side force is used to steer a drill bit. A valve system is positioned to control delivery of actuating fluid under pressure to individual pads in a manner that enables steering of the drill bit. The valve system allows drilling along a desired curve by controlling the flow of actuating fluid under pressure to specific steering pads at specific angular positions. The valve system also allows drilling along a desired trajectory by preventing exposure of the pads to the pressurized actuating fluid.

19 Claims, 5 Drawing Sheets

(56) References Cited

U.S. PATENT DOCUMENTS

| | | | |
|---|---|---|---|
| 7,503,405 B2* | 3/2009 | Hall et al. ............. | 175/61 |
| 7,849,936 B2* | 12/2010 | Hutton ............. | 175/61 |
| 8,141,657 B2* | 3/2012 | Hutton ............. | 175/61 |
| 8,376,067 B2* | 2/2013 | Downton et al. ............. | 175/61 |
| 2001/0052428 A1 | 12/2001 | Larronde et al. | |
| 2002/0011359 A1 | 1/2002 | Webb et al. | |
| 2004/0094216 A1 | 5/2004 | Wagner | |
| 2007/0221409 A1* | 9/2007 | Hall et al. ............. | 175/61 |
| 2008/0110674 A1* | 5/2008 | Jones et al. ............. | 175/25 |
| 2010/0071962 A1* | 3/2010 | Beuershausen ............. | 175/399 |
| 2011/0036632 A1 | 2/2011 | Polynstev | |
| 2011/0162890 A1 | 7/2011 | Radovan | |
| 2012/0067592 A1 | 3/2012 | Niina et al. | |
| 2012/0160564 A1 | 6/2012 | Downton et al. | |

OTHER PUBLICATIONS

International Search Report for the equivalent PCT patent application No. PCT/US2013/049198 issued on Oct. 21, 2013.

* cited by examiner

DRILLING SYSTEM WITH FLOW CONTROL VALVE

BACKGROUND

Hydrocarbon fluids such as oil and natural gas are obtained from a subterranean geologic formation, referred to as a reservoir, by drilling a well that penetrates the hydrocarbon-bearing formation. Controlled steering or directional drilling techniques are used in the oil, water, and gas industries to reach resources that are not located directly below a wellhead. A variety of steerable systems have been employed to provide control over the direction of drilling when preparing a wellbore or a series of wellbores having doglegs or other types of deviated wellbore sections.

SUMMARY

In general, the present disclosure provides a system and method for drilling of wellbores or other types of boreholes in a variety of applications. A steerable system is designed with a plurality of pads which may be selectively actuated in a lateral direction to apply a side force with respect to the steerable system. Application of the side force is used to steer a drill bit. A valve system is positioned to control delivery of actuating fluid under pressure to individual pads in a manner that enables steering of the drill bit. The valve system allows drilling along a desired curve by controlling the flow of actuating fluid under pressure to specific steering pads at specific angular positions. The valve system also allows drilling along a desired trajectory, e.g. straight trajectory, by preventing exposure of the pads to the pressurized actuating fluid.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
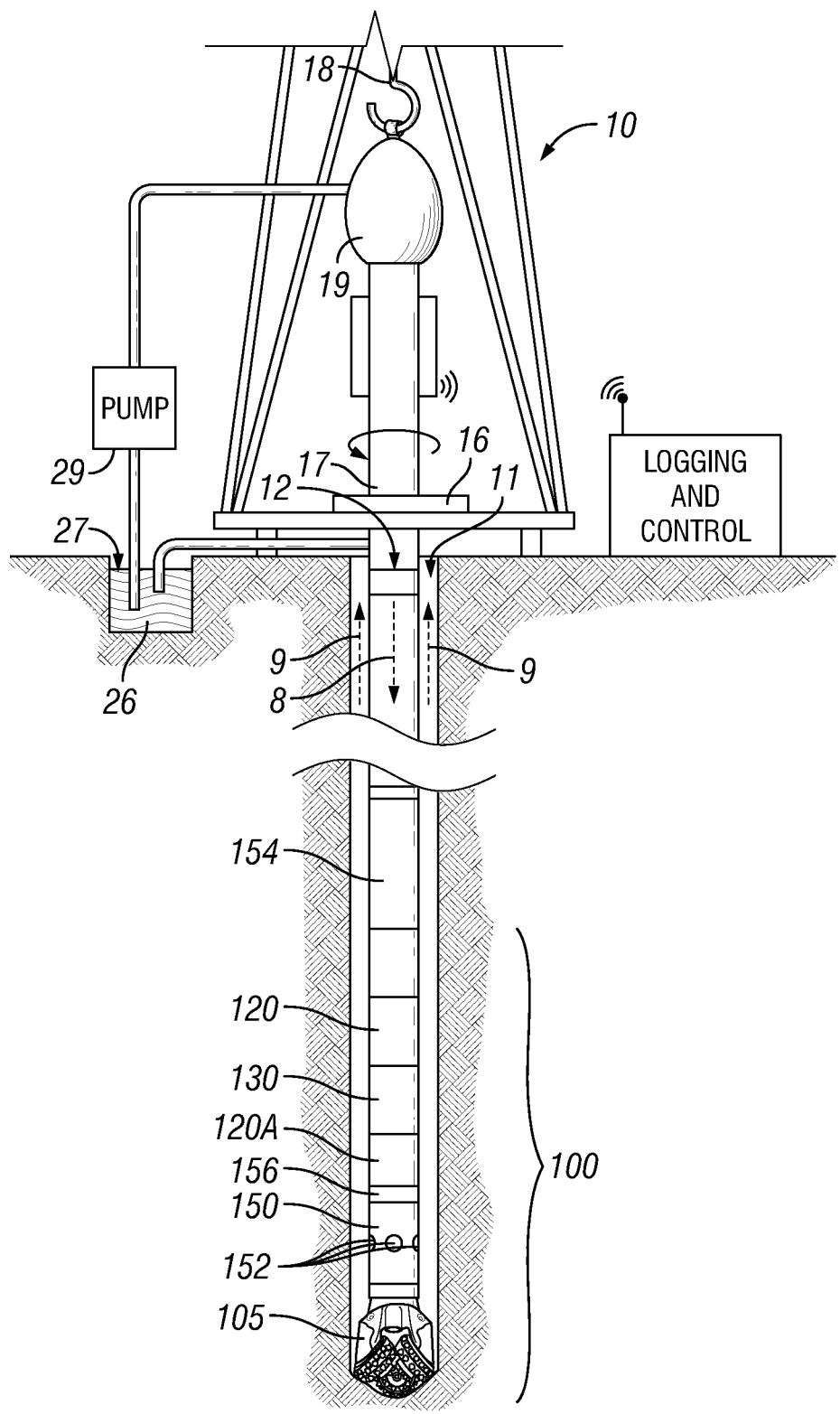
FIG. 1 is a wellsite system in which embodiments of a steerable system can be employed, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology related to steerable systems which may be used to enable directional drilling of boreholes, such as wellbores. The system and methodology facilitate drilling of wellbores or other types of boreholes in a variety of applications. Directional drilling is performed by a steerable system, e.g. a rotary steerable system, designed with a plurality of pads that may be selectively actuated in a lateral direction to apply a side force with respect to the steerable system. A valve system is utilized in controlling delivery of actuating fluid, e.g. drilling mud, under pressure to individual pads in a manner that enables steering of the drill bit. For example, the valve system may be used to direct drilling along a desired curve by controlling the flow of actuating fluid under pressure to specific steering pads at specific angular positions. The valve system also may be used to direct drilling along a generally straight trajectory by controlling, e.g. preventing, exposure of the pads to the pressurized actuating fluid. In other words, the valve system may be used to provide an automatic shutoff of high-pressure actuating fluid, otherwise applied to the steering pads, when the steerable system is in a neutral drilling mode.

In some drilling applications, the steerable system, e.g. a push-the-bit rotary steerable system, may be controlled by actuating the pads against a side of a surrounding wellbore opposite the intended bias direction. The pads are kept in contact with the surrounding wall by using the valve system to control actuators, e.g. mud powered actuators. By way of example, the valve system may comprise a rotary valve which controls the flow of fluid and the associated pressure applied to these laterally oriented actuators. When deviation in the drilling direction is desired, each actuator is extended in sequence against the surrounding wellbore wall in a direction opposite the intended bias direction. During steering along a curved section of wellbore, the actuator pads are continuously extended and retracted in a smooth, continuous motion so that the pads act against the surrounding wellbore wall to guide the bit along an intended well path. When drilling along a straight trajectory or when reducing the curve of the trajectory, the valve system may be used to effectively provide a shut-off function so the steering pads may retract to a radially inward position rather than being held in (or reciprocated to) an extended position. As a result, wear on the pads and associated components can be reduced. The drilling of straight sections, as well as the drilling of certain curved sections with desired dog leg severity, may be controlled by adjusting the duty cycle, the full bias mode, and the neutral mode of the steerable system.

In some applications, the valve system is formed as a rotary valve having a plurality of interacting components, such as interacting disc members. The interacting components may be controlled to selectively provide the shut-off function. For example, a shut-off function may be automatically activated when a rotor speed of the valve exceeds the rotary speed of a surrounding collar. Once the pressurized actuating fluid, e.g.

pressurized drilling mud, flowing to the pads is shut off, the pressure acting against the actuators/pads is released and the pads are no longer pushed in a laterally outward direction against, for example, a surrounding wellbore wall.

The steerable system described herein is useful in a variety of drilling applications in both well and non-well environments and applications. For example, the steerable system can facilitate drilling of boreholes through earth formations and through a variety of other earth materials to create many types of passages. In well related applications, the steerable drilling system can be used to facilitate directional drilling for forming a variety of deviated wellbores. An example of a well system incorporating the steerable drilling system is illustrated in FIG. 1.

Referring to FIG. 1 a wellsite system is illustrated in which embodiments of the steerable system described herein can be employed. The wellsite can be onshore or offshore. In this system, a borehole 11 is formed in subsurface formations by rotary drilling and embodiments of the steerable system can be used in many types of directional drilling applications.

In the example illustrated, a drill string 12 is suspended within the borehole 11 and has a bottom hole assembly (BHA) 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. A top drive system could alternatively be used.

In the example of this embodiment, the surface system further comprises drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120 and a measuring-while-drilling (MWD) module 130. The bottom hole assembly 100 also may comprise a steerable system 150, and a drill bit 105. In some applications, the bottom hole assembly 100 further comprises a motor which can be used to turn the drill bit 105 or to otherwise assist the drilling operation. Additionally, the steerable system 150 may comprise a rotary steerable system to provide directional drilling.

The LWD module 120 is housed in a special type of drill collar and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a pressure measuring device.

The MWD module 130 is also housed in a special type of drill collar and can contain one or more devices for measuring characteristics of the drill string and drill bit. The MWD tool further includes an apparatus (not shown) for generating electrical power to the downhole system. This may include a mud turbine generator (also known as a "mud motor") powered by the flow of the drilling fluid, it being understood that other power and/or battery systems may be employed. In the present embodiment, the MWD module may comprise a variety of measuring devices: e.g. a weight-on-bit measuring device, a torque measuring device, a vibration measuring device, a shock measuring device, a stick slip measuring device, a direction measuring device, and an inclination measuring device. As described in greater detail below, the steerable system 150 also comprises instrumentation to measure desired parameters, such as weight on bit and torque on bit parameters.

The steerable system 150 can be used for straight or directional drilling to, for example, improve access to a variety of subterranean, hydrocarbon bearing reservoirs. Directional drilling is the intentional deviation of the wellbore from the path it would naturally take. In other words, directional drilling is the steering of the drill string so that it travels in a desired direction.

Directional drilling is useful in offshore drilling, for example, because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operations. Often the drill bit will veer off of a planned drilling trajectory because of the unpredictable nature of the formations being penetrated or the varying forces that the drill bit experiences. When such a deviation occurs, a directional drilling system may be used to put the drill bit back on course.

In some directional drilling applications, steerable system 150 includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems.

In the point-the-bit system, the axis of rotation of the drill bit is deviated from the local axis of the bottom hole assembly in the general direction of the new hole. The hole is propagated in accordance with the customary three-point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953.

In the push-the-bit rotary steerable system there is no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form, the drill bit is required to cut sideways in order to generate a curved hole. Examples of push-the-bit type rotary steerable systems and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; and 5,971,085.

As illustrated, the steerable system 150 may comprise a plurality of actuators 152 which may be selectively actuated via actuating fluid (see flow of actuating fluid, e.g. drilling mud, represented by arrow 8) to control the steering of drill bit 105. By way of example, the system may utilize three circumferentially spaced actuators 152 although other numbers of actuators 152 may be employed depending on the parameters of a given drilling application. The flow of actuating fluid is directed to the actuators 152 to provide the desired steering of drill bit 105 during drilling of curved sections of wellbore. In the example illustrated, the actuating fluid is directed (see arrow 8) down along, e.g. through, a tubing string 154 into which the steerable system 150 may be coupled. Additionally, a valve system 156 is used to control delivery of the actuating fluid to specific actuators 152 during drilling of curved sections of wellbore (or during drilling of straight sections in a neutral or neutation mode). It should be noted that some steerable systems 150 may be designed to enable straight drilling when valve system 156 is in an open flow position by using a neutation mode. By adjusting the duty cycle (full bias and neutation), the trajectory, e.g. dog leg severity, can be controlled. When the valve system 156 is shut off or closed, the valve system 156 may effectively be placed in the neutation mode and used during drilling of straight trajectories or to create a bias mode for curved trajectories via the duty cycle. Accordingly, the valve system 156 can be used to prevent flow of pressurized fluid to the actuators 152, thus allowing the actuators 152 to retract during drilling along desired trajectories, e.g. straight trajectories. Refraction of the actuators 152 protects the actuators and related components from a variety of impacts, and other stresses that otherwise may be incurred during drilling of generally straight wellbore sections.

Figure 2:
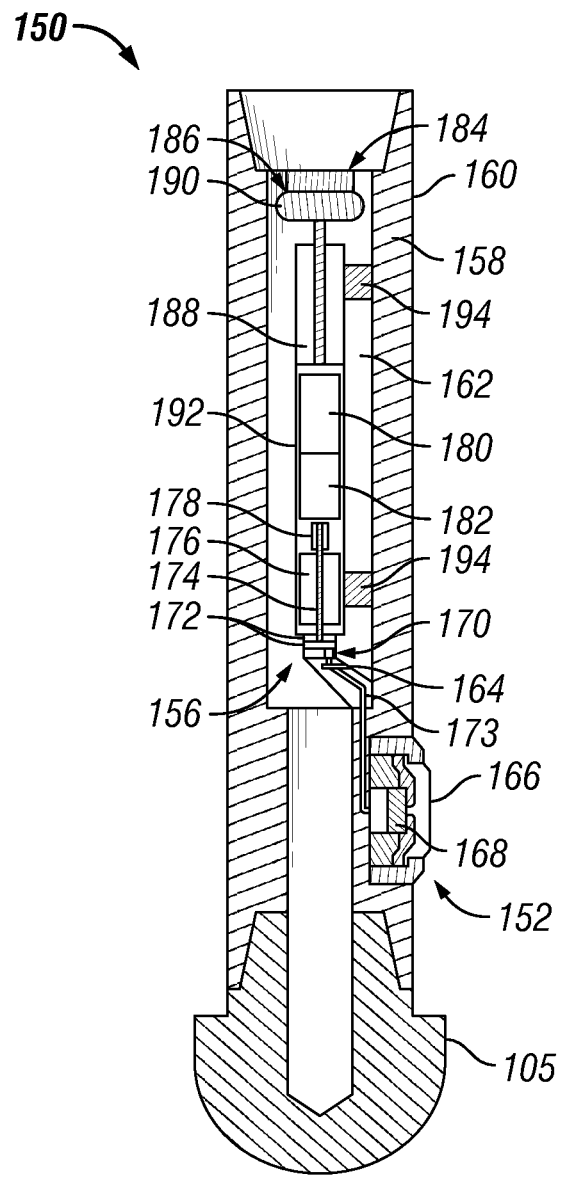
FIG. 2 is a schematic illustration of an example of a steerable system for directional drilling, according to an embodiment of the disclosure.

Referring generally to FIG. 2, an illustration is provided of an embodiment of steerable system 150 in the form of a rotary steerable system. In this embodiment, drill bit 105 is mounted to a drill collar or housing 158 which has a connector end 160 opposite drill bit 105. Connector end 160 is designed for coupling the rotary steerable system 150 to the next adjacent, uphole component of tubing string 154. Additionally, the drill collar/housing 158 comprises a hollow interior 162 designed to hold a variety of rotary steerable system components. For example, a plurality of the actuators 152 may be mounted in housing/collar 158 at circumferentially spaced positions for lateral movement with respect to the drilling direction. In some applications, flow of actuating fluid to the actuators 152 may be monitored by a sensor 164. Additionally, the actuators 152, e.g. three actuators, may comprise or be coupled with steering pads 166 mounted to the drill collar 158 for lateral, e.g. radial movement, with respect to the drill collar 158 and rotary steerable system 150. In one example, each steering pad of the plurality of steering pads 166 may be moved by a corresponding piston 168 which is hydraulically actuated via drilling/activating fluid 26, e.g. drilling mud, appropriately metered by valve system 156.

In the example illustrated, valve system 156 comprises a rotational valve 170, such as a spider valve. The rotational valve 170 comprises a plurality of interacting components 172, such as disc components rotatably mounted with respect to each other. The interacting components 172 are actuated to selectively control the flow of actuating fluid 26 to the actuators 152 (of which one is illustrated in FIG. 2) while also being capable of blocking flow to thus release the pressure of the actuating fluid acting against pistons 168. Releasing the pressure allows the plurality of pads 166 to retract radially inward. The rotational valve 170 may be selectively rotated to enable flow of actuating fluid and/or to block flow of actuating fluid 26 with respect to selected individual and/or multiple steering pads 166. By way of example, the actuating fluid 26 may be delivered through hydraulic lines 173 to act against pistons 168. During rotation of drill collar/housing 158 and drill bit 105 for drilling of wellbore 11, the interacting components 172 of valve system 156 undergo a controlled, relative rotation to ensure either delivery of the actuating fluid 26 through desired hydraulic lines 173 and on to desired movable actuators 152 or blockage of the actuating fluid.

Depending on the specific application, the steerable system 150 and the valve system 156 may comprise a variety of components. Examples of some of these components are illustrated in FIG. 2. For instance, at least one of the interacting valve components 172 may be mounted to a drive shaft 174 which is rotated by a motor 176, such as an electric motor. One or more sensors 178, such as an encoder, also may be operatively engaged with drive shaft 174 to monitor the angular orientation of at least one of the interacting components 172 of valve system 156 relative to the drill collar 158. The steerable system 150 further comprises control electronics 180 which may comprise a micro-controller 182, e.g. a microprocessor. The micro-controller 182 receives data from the sensors/encoder 178 and uses the data to control motor 176 which, in turn, controls the angular positioning of a rotational valve 170. The controller 182 also may be designed for communication with a surface control system to receive commands and/or to relay data. Furthermore, control electronics 180 may comprise additional components, such as a direction and inclination package containing magnetometers and accelerometers. Control over the valve position enables a unique control over duration of the side forces applied by one or more of the steering pads 166. As explained in greater detail below, a portion of the rotational valve 170, e.g. a stator, may be designed to move synchronously with the drill collar/housing 158. Additionally, the rotational valve 170 may be controlled to align flow ports/openings with corresponding openings of the stator to control side force duration applied by pads 166 at specific angular orientations.

Electric power may be provided to controller 182, to motor 176, and to other components of steerable system 150 via a suitable power source 184. By way of example, the power source 184 may comprise batteries and/or a turbine 186. The turbine 186 may comprise an alternator 188 driven by rotation of turbine blades 190 which are rotated by the pressurized flow of drilling/actuating fluid 26 down through steerable system 150 and drill bit 105. In some applications, several of the features of the steerable system 150 may be mounted within a pressure housing 192 to protect them against the relatively high pressures of the drilling/activating fluid. For example, motor 176, encoder 178, controller 182, and alternator 188 may be disposed within a pressure housing 192. In this embodiment, the pressure housing 192 is rigidly attached to the drill collar 158 with suitable mounting structures 194. However, the various components and component configurations described are provided as examples and many other types of components, arrangements of components, and additional components may be used in a variety of steerable system configurations.

The steerable system 150 comprises at least one movable steering pad 166, e.g. 1, 2, 3 or 4 movable steering pads, which are actuated by the differential pressure between the inside and outside of the drill collar/housing 158. When a particular steering pad 166 is actuated and pushes against, for example, the surrounding formation, the steerable system 150 is deflected in the opposite direction and provides steering capability. As the drill collar/housing 158 rotates, the valve system 156 is able to selectively open or shut off pads 166 by allowing actuating fluid to enter the selected hydraulic line 173 which delivers the actuating fluid to the piston 168 behind the corresponding steering pad 166. The valve system 156 also may be used to prevent flow to any of the pistons 168 so as to allow pads 166 to retract while drilling along a straight trajectory and/or while in neutation mode. According to an example, valve system 156 may be used to prevent flow to pistons 168 when drilling straight or when reducing the severity of a curve during drilling. The shaft encoder 178 or other suitable sensors may be used to provide data to the controller 182 or other processor to track the angular orientation of the interacting valve component or components 172.

In FIG. 2, the actuators 152 are illustrated as moving the pads 166 against a surrounding wellbore wall. However, the rotary steerable system 150 may have a variety of other designs including hybrid designs which include features of both point-the-bit and push-the-bit systems. In such hybrid systems, the hydraulic lines 173 may deliver actuating fluid to corresponding pistons/pads to deflect a stabilizer sleeve. The deflection or pivotable movement of the stabilizer sleeve controls, e.g. changes, the direction of drilling.

Figure 3:
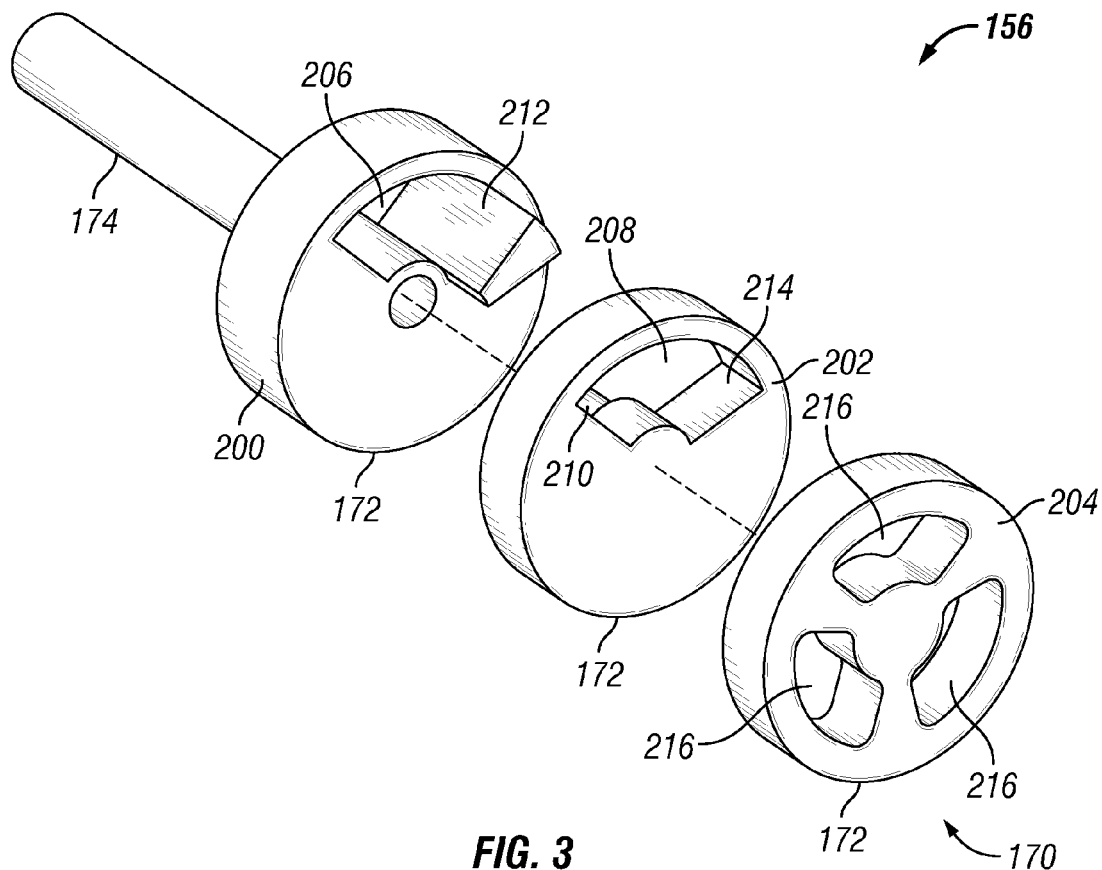
FIG. 3 is an exploded view of an example of a valve system that may be used with the steerable system, according to an embodiment of the disclosure.
Figure 4:
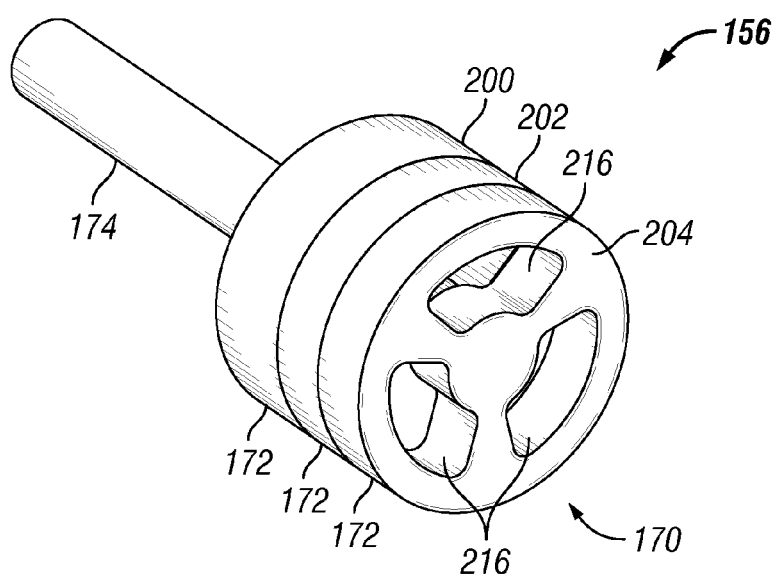
FIG. 4 is another illustration of the valve system illustrated in FIG. 3 but in an assembled form, according to an embodiment of the disclosure.

Referring generally to FIGS. 3 and 4, an embodiment of valve system 156 is illustrated. In this embodiment, valve system 156 is in the form of rotary or rotational valve 170 having interacting valve components 172. By way of example, the interacting valve components 172 may be generally disc shaped. In this embodiment, the interacting valve components 172 comprise a rotor 200, a blind 202, and a stator 204.

The rotor 200 is mechanically connected to a control device, e.g. drive shaft 174, which sets the rotational speed of the rotor during a drilling operation. The rotor 200 comprises a rotor opening 206 which is exposed to actuating fluid 26 (see arrow 8 in FIG. 1) for powering actuators 152. Similarly, the blind 202 comprises a blind opening 208. In some embodiments, the rotor opening 206 and the blind opening 208 are similarly sized and extend axially through the rotor 200 and the blind 202, respectively. The blind 202 is rotationally or pivotably attached to rotor 200 via a coupling shaft 210 which allows the blind 202 to rotate/pivot with respect to rotor 200. Additionally, a peg 212 is disposed to limit the relative rotation of the blind 202 with respect to the rotor 200. By way of example, the peg 212 may be mounted to rotor 200 for extension into blind opening 208 of blind 202 when the interacting valve components 172 are engaged, as illustrated in FIG. 4. As rotor 200 is rotated in one direction or the other, peg 212 acts as a mechanical stop and limits the relative rotation of rotor 200 with respect to blind 202 by engaging one or the other of end walls 214. In the example illustrated, end walls 214 define the circumferential ends of blind opening 208.

Stator 204 is mounted in a manner which allows the rotor 200 and blind 202 to rotate relative to stator 204. The stator 204 comprises a plurality of stator openings 216 which are coupled with respective actuators 152 via, for example, hydraulic lines 174. In at least some embodiments, the number of stator openings 216 is the same as the number of actuators 152, and each stator opening 216 is associated with a corresponding actuator 152. Depending on the design of steerable system 150, the stator 204 may be coupled with the drill collar/housing 158 or with another suitable system component for rotation with steerable system 150. By controlling the rotation of rotor 200, actuating fluid 26 may be delivered through the desired stator opening or openings 216 while the drill collar/housing 158 is at a desired angular orientation to achieve controlled steering of steerable system 150 by causing extension of the desired pad 166 at the desired angular position.

Figure 5:
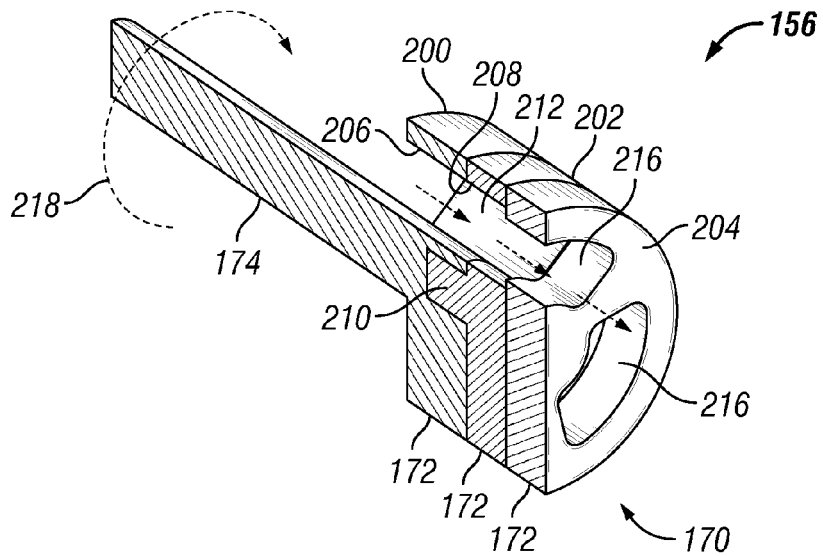
FIG. 5 is an illustration of the valve system in an open flow position to enable steering of the steerable system along a desired path, according to an embodiment of the disclosure.
Figure 6:
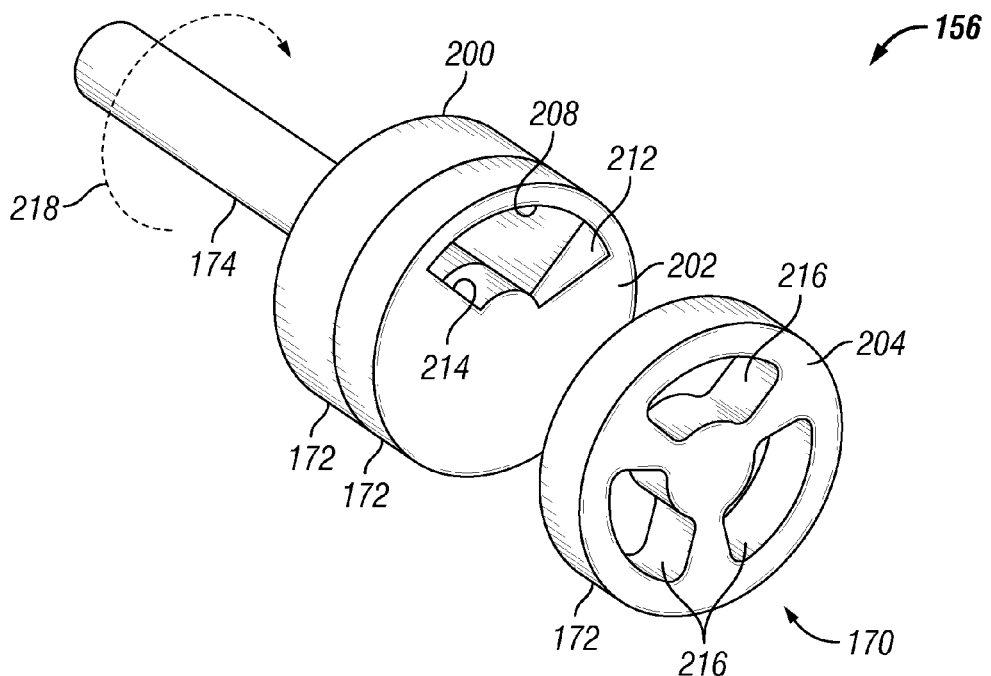
FIG. 6 is another illustration of the valve system in an open flow position, according to an embodiment of the disclosure.

Referring generally to FIGS. 5 and 6, an operational example is provided in which the rotor opening 206 and the blind opening 208 have been aligned for delivery of actuating fluid through the desired stator openings 216 of stator 204. In this example, shaft 174 and rotor 200 are rotated in the direction of arrow 218 which causes relative rotation of rotor 200 with respect to blind 202. The relative rotation continues until peg 212 moves against the end wall 214 which holds rotor opening 206 and blind opening 208 in an aligned, open flow arrangement, as best illustrated in FIG. 6. This open flow arrangement allows actuating fluid 26, e.g. drilling mud, to flow through rotor 200 and through blind 202 to stator 204. The relative rotation of rotor 200 and blind 202 in the direction of arrow 218 is controlled so as to deliver actuating fluid through desired stator openings 216 while stator 204 is at a desired angular position.

Figure 7:
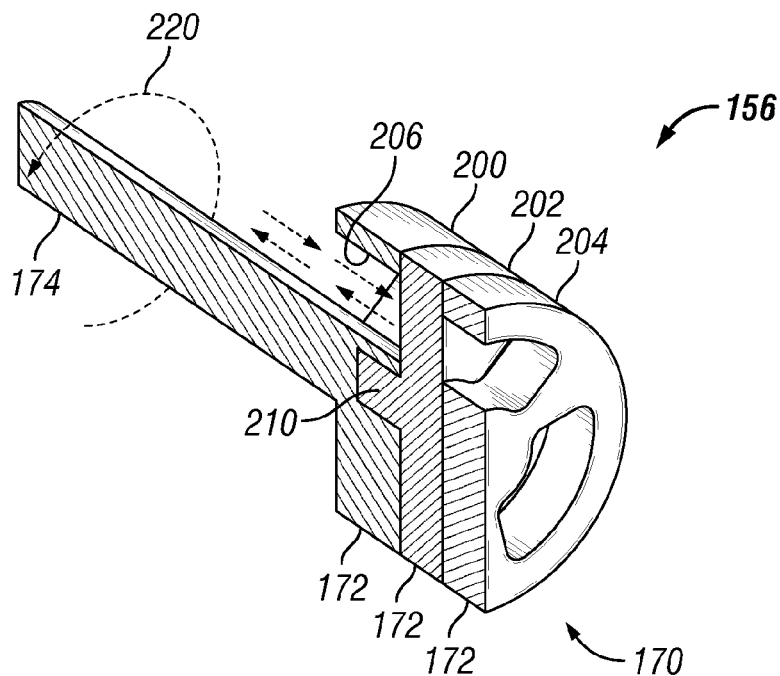
FIG. 7 is an illustration of the valve system in a closed flow position to facilitate steering of the steerable system along a predetermined trajectory, e.g. a straight trajectory, according to an embodiment of the disclosure.
Figure 8:
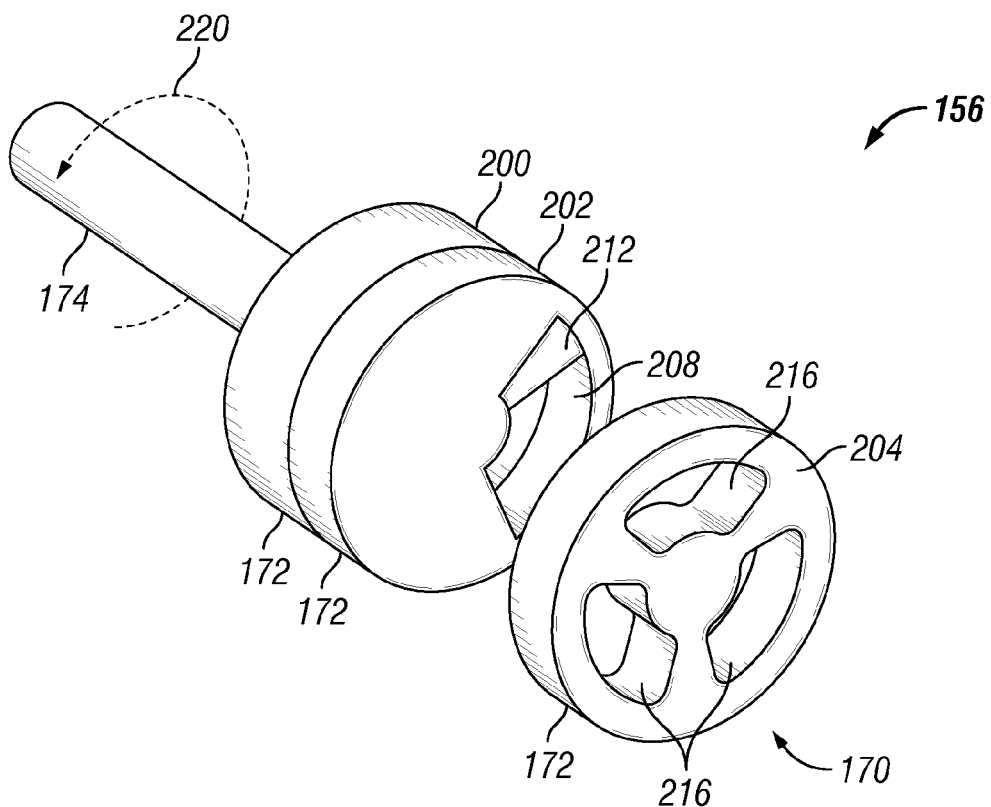
FIG. 8 is another illustration of the valve system in a closed position, according to an embodiment of the disclosure.

Referring generally to FIGS. 7 and 8, another operational example is provided in which the rotor opening 206 and the blind opening 208 have been misaligned to prevent or block delivery of actuating fluid to stator 204. In this example, shaft 174 and rotor 200 are rotated in the direction of arrow 220 which again causes relative rotation of rotor 200 with respect to blind 202. The relative rotation continues until peg 212 moves against an opposite end wall 214 which holds rotor opening 206 and blind opening 208 in a misaligned or closed flow arrangement, as best illustrated in FIG. 8. This closed arrangement prevents actuating fluid, e.g. drilling mud, from flowing through rotor 200 and blind 202 to stator 204. The relative rotation of rotor 200 and blind 202 in the direction of arrow 220 is similarly controlled so as to continue blocking flow of actuating fluid to stator 204. Additionally, any pressurized actuating fluid 26 between blind 202 and actuators 152 may be bled off to enable retraction of the actuators 152/pads 166 to a radially inward position. The actuating fluid may be bled off via openings or clearances past piston 168 or through other suitable bleed passages.

When the rotor 200 and blind 202 are placed in the open flow position illustrated in FIGS. 5 and 6, controlled delivery of actuating fluid may be provided through stator openings 216 to actuate the actuators 152 in a desired pattern and to thus provide drilling along a desired curved trajectory. Effectively, the blind 202 is driven by the rotor 200 in the direction of arrow 218 and the window formed by aligned openings 206, 208 remains open giving passage of the actuating fluid. This open flow configuration occurs, for example, when the rotor 200 is rotated at less than the rotational speed of the drill collar/housing 158.

However, moving rotor 200 and blind 202 to the flow blocking position illustrated in FIGS. 7 and 8 effectively blocks flow of actuating fluid to the actuators 152 and permits retraction of the actuators 152 to provide controlled drilling along a generally straight trajectory without placing undesirable stresses on the pads 166, actuators 152, or other associated components. Effectively, the blind 202 is driven by the rotor 200 in the direction of arrow 220 and the actuating fluid window remains closed providing no passage for the actuating fluid 26. This closed configuration occurs, for example, when the rotor 200 is rotated at or above the rotational speed of the drill collar/housing 158. Accordingly, if the steerable system 150 and drill bit 105 are to drill in a neutral mode along a generally straight trajectory, rotation of rotor 200 is sped up to misalign rotor opening 206 and blind opening 208, thus closing the actuating fluid window.

The illustrated steerable system 150 and valve system 156 are provided as examples, however a variety of other components and configurations may be utilized. For example, the blind 202 can be pivotably mounted to the stator 204. Additionally, the blind 202 may comprise or be used in cooperation with a latching system. For example, the blind 202 or another suitable third component can be locked for rotation in one direction with a latching system while being linked to the rotor 200 with a peg or a key which slides or indexes over a suitable angle to selectively close off the flow of actuating fluid. When the rotor speed exceeds the rotational speed of collar/housing 158, the latching system locks the blind or other intermediate component in a desired flow position.

In another example, the valve system 156 may be designed to enable selective retraction of rotor 200 away from the stator 204 in a manner which allows flow of actuating fluid to all of the actuators 152 simultaneously and continuously. This allows the plurality of pads 166 to be moved and locked in a stable, equally actuated position so steerable system 150 is able to steer the drilling along a generally straight trajectory. Such a design can be used, for example, when actuators 152 and pads 166 are disposed within a steering sleeve and act against the steering sleeve to provide steering inputs.

In some applications, a small passage may be formed through the blind 202 to allow a continuous, small flow of actuating fluid to the actuators 152. The flow rate is selected so the flow of actuating fluid does not exceed the capacity of a choke associated with each actuator piston 168. The low-level flow of actuating fluid can be used to help clean the chambers containing piston 168 and to facilitate transition of the blind 202 between open flow and closed flow positions by reducing the pressure differential across valve system 156.

The valve system 156 and blind 202 may be operated without a sensor or switch to determine the operational mode. In some applications, however, sensor 164 may be in the form of a simple flow switch, pressure sensor, or other suitable sensor positioned to detect when flow of actuating fluid is shut off via blind 202. The valve status can be sent to the surface via a variety of telemetry systems used in drilling applications, e.g. via the measurement-while-drilling (MWD) telemetry system.

Other techniques also may be employed to remove or reduce the effects of pressurized actuating fluid acting on pads 166. For example, the rotor 200 can be rotated at a sufficiently fast speed to prevent energization of the pistons 168 in actuators 152. When the rotor 200 is rotated at a sufficiently high speed, the chambers containing pistons 168 do not have time to sufficiently fill across corresponding chokes. As a result, insufficient time is provided to enable build-up of pressure against pistons 168 and the actuators 152 are not actuated against the surrounding wall.

With many of these embodiments, vibration and swirling of the drill bit 105 is reduced because the pads 166 are not actuated while in the neutral mode, e.g. while drilling along a generally straight trajectory. Consequently, improved rates of penetration may be achieved in a variety of drilling applications while reducing side forces otherwise incurred by drill bit 105. However, the drilling methodology may vary considerably from one drilling application and/or environment to another.

It should be noted that valve system 156 also may be used in the closed position to facilitate deployment of lost circulation material (LCM) without damaging or contaminating the flow line(s) between the rotary valve 170 and the steering pad(s) 166. When the valve system 156 is transitioned to the closed position, drilling fluid containing the LCM material is prevented from flowing into the flow lines extending to the steering pads 166. Instead, the LCM material is redirected, e.g. redirected into an annular space for flow through the drill bit.

Depending on the drilling application, the bottom hole assembly, steerable system, and the overall drilling system may comprise a variety of components and arrangements of components. Additionally, the valve system may comprise or work in cooperation with many different types and arrangements of interacting components, sensors, and systems depending on the specific parameters of a given drilling application. The valve system may comprise a rotary style valve with disc-like interacting components, however other styles and numbers of interacting components may be used to selectively control and to selectively block the flow of actuating fluid to the steering actuators. In some embodiments, a simple sensor or switch may be used to monitor the closing and opening of flow through the valve system while other embodiments may operate without a sensor or with different techniques for monitoring the operational position of the valve system.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for drilling, comprising:
   a rotary steerable system having a plurality of pads which may be selectively actuated to apply a side force with respect to the rotary steerable system to steer a drill bit;
   a valve system positioned to control delivery of actuating fluid to individual pads of the plurality of pads, the valve system comprising a stator having stator openings to selectively direct fluid to each pad of the plurality of pads, a rotor having a rotor opening that may be aligned with the selected stator openings to deliver actuating fluid to the selected stator openings, and a blind having a blind opening that may be selectively aligned or misaligned with the rotor opening to allow or block flow through the rotor opening;
   an electric motor coupled to the rotor via a shaft, the electric motor being operable to control the angular position of the rotor with respect to the blind and the stator and thus to control a drilling direction via delivery of the actuating fluid to selected individual pads, the electric motor and the shaft operating independently of flow of the actuating fluid; and
   a sensor positioned to monitor an angular position of at least one of the rotor, the blind, and the stator.

2. The system as recited in claim 1, wherein the stator, the rotor and the blind are disc shaped.

3. The system as recited in claim 2, wherein the blind is positioned between the rotor and the stator.

4. The system as recited in claim 1, wherein the rotor comprises a peg that extends into the blind opening to cause rotation of the blind with the rotor upon engagement of the peg with a side of the blind opening.

5. The system as recited in claim 1, further comprising a drill string into which the rotary steerable system is coupled.

6. The system as recited in claim 5, wherein the pads of the plurality of pads extend outwardly from a housing for engagement with a surrounding wellbore wall.

7. The system as recited in claim 6, wherein the plurality of pads comprises at least three pads circumferentially spaced about the housing.

8. The system as recited in claim 1, wherein the blind is rotatably coupled to the rotor by a shaft.

9. The system as recited in claim 1, wherein the plurality of pads comprises a number of pads matching the number of stator openings.

10. A method for drilling, comprising:
coupling a drill bit to a rotary steerable system having a plurality of actuators;
delivering actuating fluid to the rotary steerable system to enable actuation of the plurality of actuators;
positioning a valve system, having a rotor, a blind, and a stator, in the flow path of the actuating fluid moving toward the plurality of actuators;
controlling delivery of the actuating fluid to specific actuators at specific rotational positions via relative rotation of the rotor and the stator; and
causing relative rotation of the rotor and the blind via an electric motor to selectively allow or block flow of actuating fluid to the stator; and
operating the electric motor independently of the flow of actuating fluid.

11. The method as recited in claim 10, wherein causing comprises aligning a rotor opening with a blind opening to allow flow of actuating fluid to the stator.

12. The method as recited in claim 10, wherein causing comprises misaligning a rotor opening and a blind opening to block flow of actuating fluid to the stator.

13. The method as recited in claim 12, wherein controlling comprises delivering the actuating fluid through stator openings to specific actuators fluidly coupled with the stator openings.

14. The method as recited in claim 13, further comprising drilling along a curved path by directing flow of actuating fluid to specific actuators while those specific actuators are at a desired rotational position with respect to a surrounding wellbore wall.

15. The method as recited in claim 12, further comprising drilling along a straight path by blocking flow of actuating fluid through the stator openings via misalignment of the rotor opening and the blind opening.

16. A system for drilling, comprising:
a drill bit;
a steerable system coupled to the drill bit, the steerable system comprising a plurality of actuators oriented laterally with respect to a drilling direction;
a tubing string coupled to the steerable system;
a valve system positioned to receive pressurized drilling mud delivered down along the tubing string, the valve system having a plurality of interacting members comprising a rotor with a rotor opening, a blind with a blind opening, and a stator with a stator opening, which control flow of the pressurized drilling mud to individual actuators during drilling of curved sections, the plurality of interacting members also being actuatable to block flow of pressurized drilling mud to the plurality of actuators to cause drilling of either a straight section or a curve of reduced severity;
an electric motor connected to at least one of the plurality of interacting members, the electric motor being operable to change relative positions of the plurality of interacting members to control flow of the pressurized drilling mud, the electric motor being disposed within a pressure housing isolating the electric motor from the drilling mud;
a sensor to monitor the relative positions; and
a downhole controller coupled with the sensor and the electric motor, the downhole controller controlling operation of the electric motor based on signals obtained from the sensor.

17. The system as recited in claim 16, wherein the plurality of actuators is allowed to move to a radially inward position when flow of pressurized drilling mud to the plurality of actuators is blocked.

18. The system as recited in claim 16, wherein the number of stator openings matches the number of actuators.

19. The system as recited in claim 18, wherein the actuators move in a radial direction and into contact with a surrounding wellbore wall during drilling of the curved sections.

* * * * *